United States Patent [19]

Heintz

[11] Patent Number: 4,603,915
[45] Date of Patent: Aug. 5, 1986

[54] WHEEL COVER WITH A WIRE SPRING RING

[75] Inventor: Harald M. Heintz, Weinstadt, Fed. Rep. of Germany

[73] Assignee: Daimler-Benz Aktiengesellschaft, Fed. Rep. of Germany

[21] Appl. No.: 586,974

[22] Filed: Mar. 7, 1984

[30] Foreign Application Priority Data

Apr. 28, 1983 [DE] Fed. Rep. of Germany ....... 3315342

[51] Int. Cl.⁴ ................................................. B60B 7/06
[52] U.S. Cl. .............................. 301/37 P; 301/37 CD
[58] Field of Search ............... 301/37 R, 37 P, 37 TP, 301/37 PB, 37 B, 37 CD

[56] References Cited

U.S. PATENT DOCUMENTS 2,736,610  2/1956  Waite ................................. 301/37 P
3,480,329  11/1969 Foster et al. ...................... 301/37 R
3,747,984  7/1973  Andrews et al. .................. 301/37 P
4,470,639  9/1984  Loper ............................. 301/37 P X

FOREIGN PATENT DOCUMENTS 2943138  5/1981  Fed. Rep. of Germany .
3137319  4/1983  Fed. Rep. of Germany .

Primary Examiner—David A. Scherbel
Attorney, Agent, or Firm—Craig & Burns

[57] ABSTRACT

A wheel cover with a wire ring, especially for passenger motor vehicles, whereby the wire ring is composed of several sections, preferably of generally circular segments, and is constructed as a prestressed bent spring. This bent spring is received by guides mounted on the wheel cover and is advantageously retained by nose-like holding members when installed in the wheel cover. After the wheel cover is mounted on the wheel rim, the bent spring attains a generally circular contour and moves away from the nose-like holding members. The wire spring can be manufactured in a very simple and cost-favorable manner and may, since it is prestressed, be provided with a soft spring characteristic. As a result thereof, the system, i.e., cover, wheel, and connecting spring ring, becomes substantially independent of diameter variations of the cover.

16 Claims, 4 Drawing Figures

WHEEL COVER WITH A WIRE SPRING RING

The present invention relates to a wheel cover with a wire spring ring, especially for passenger motor vehicles, whereby the wire ring is received in the installed condition by at least two guides secured to a wheel cover and whereby these guides are adapted to engage in corresponding recesses of a wheel rim.

A wheel rim with a wire ring is generally known, for example, from German Patent . . . (German Patent Application No. P 29 43 138.7-21). The invention described therein provides outwardly projecting lug-shaped parts on the wire ring, which are adapted to engage in a recess of the wheel rim and are retained axially and in the circumferential direction on the wheel cover in guides, whereby the guides are constructed as tab-shaped covers which externally overlap the lug-shaped parts and are constructed so as to yield in the radial direction. Such a wheel cover offers the advantage that the axial guidance and the guidance in the circumferential direction can be realized with relatively low manufacturing expenditures and that damaging or scratching of the guides and of the wheel rim are precluded. Additionally, rattle noises are avoided.

However, this prior art construction is disadvantageous because a relatively large expenditure has to be accepted for the manufacture of the wire ring provided with protruding lug-shaped parts. The construction of a non-prestressed wire ring with a relatively high spring constant additionally leads to the fact that the available spring force fluctuates substantially as a result of tolerance-conditioned fluctuations of the rim diameter.

Accordingly, the present invention is concerned with the task of providing a wheel cover generally of the aforementioned type, in which a wire spring ring can be manufactured favorably from a cost point of view and in which a tolerance-conditioned fluctuation of the rim diameter leads only to a very small fluctuation of the available spring force.

The underlying problems are solved according to the present invention in that the wire ring is constructed as a prestressed bent spring and, in the unstressed condition, has a circumference formed by several ring sections, whereby one section each is coordinated to a guide with the remaining sections disposed therebetween, and in that the bending spring attains a shape corresponding to a circle after it is clamped in the guides of the wheel cover and after the wheel cover is mounted onto the wheel rim.

Such a wire ring constructed as a bent spring can be manufactured in a very simple and cost-favorable manner. Additionally, the handling of the cover during the installation is facilitated by the prestress of the guides since the guides secured at the wheel cover are already prestressed and have only a slight diameter difference with respect to the cover. It is additionally possible by the use of the prestressed bending spring to utilize a spring with a relatively soft spring characteristic, i.e., with a small spring constant. This soft spring characteristic offers the advantage that a tolerance-conditioned fluctuation of the rim diameter leads to only a very small fluctuation of the available spring force. Finally, the wire ring constructed as bending spring necessitates only a minimum amount of space in the wheel cover.

The sections forming the wire ring may be composed of different contours in the unstressed condition. A preferred embodiment provides that the sections of the prestressed bending spring in the unstressed condition form a regular non-circular configuration which is not intersected at any place by a tangent placed along its circumference. The non-circular configuration may be constructed, for example, as an oval or polygon (triangle, quadrangle, pentagon . . , ). The bending spring, after being clamped into the guides, attains a shape approximating a circle, especially corresponding to a circle. This effect can be achieved even more readily if—as provided by a further feature of the present invention—the sections are constructed arcuately shaped and if the sections coordinated to the sections disposed between the guides enclose an inscribed regular polygon whereas the sections coordinated to the guidances intersect the corners of this polygon.

In order to be able to construct the guides relatively short in relation to the circumference, it is furthermore advantageous if the sections coordinated to the guides are shorter than the sections coordinated to the sections disposed between the guides.

A particularly simple embodiment is achieved if the sections are constructed as circular segments. It is appropriate in connection therewith to so construct the wire ring that the circular segments coordinated to the guides and the circular segments coordinated to the sections disposed therebetween have different arcuate lengths, different circle center points and/or different radii. The radii, the arcuate lengths and their relation to one another may even be so selected that the wire ring attains an ideal circular shape after the wire ring is clamped into the guides and after the wheel cover is installed. However, it should be pointed out that a completely or perfectly circular shape cannot be attained as yet after the wire ring is thus inserted into the guides. The prestress, however, suffices to establish a force-locking connection between the wire ring and the guides. After the installation of the wheel cover on the wheel rim, the wire ring then assumes a completely circular contour.

In a wheel cover according to the present invention, at least two guides must be provided for the wire ring. Accordingly, this wire ring consists of at least four sections. However, three guides are preferably used whereby the wire ring in this case consists of six sections. The sections of the wire ring coordinated to the sections disposed between the guides circumscribe in this case a regular triangle. However, still more guides and segments are also feasible within the scope of the present invention, for example, by reference to a square or regular pentagon.

The guides provided at the wheel cover may be constructed in an advantageous embodiment as tab-shaped covers and may be provided with a groove serving to receive the bending spring. This aspect of the present invention, known in principle, enables a simple manufacture of the guides and an easy installation of the wire ring constructed as bending spring. In particular, a sufficient guidance in the axial and in the circumferential direction is assured thereby. Further axial guides may be provided in case of need and may be constructed in any known manner.

Furthermore, nose-like retaining or holding members may be provided intermediate the guides of the wheel cover, which are connected with the wheel cover or are an integral part thereof, whereby the abutments of these nose-like holding members are directed radially outwardly and the bending spring abuts at these abutments in the condition in which the wire ring is clamped into the guides while the wheel cover is not yet mounted on the wheel rim. These nose-like holding members are in force-locking connection with the wire ring when the latter is inserted into the wheel cover and while the wheel cover is not yet installed on the wheel rim.

Consequently, separate guides and abutments for fixing this wire ring in the wheel cover need not be provided. After the installation of the wheel cover on the wheel rim, the wire ring will move away from the nose-like holding members, as a result of which a prestressed spring with circular contour will be realized.

The wire ring constructed as bending spring with the coordinated guides and/or nose-like retaining members may be provided in larger numbers.

These and other objects, features and advantages of the present invention will become more apparent from the following description when taken in connection with the accompanying drawings which show, for purposes of illustration only, one embodiment in accordance with the present invention, and wherein.

Figure 1:
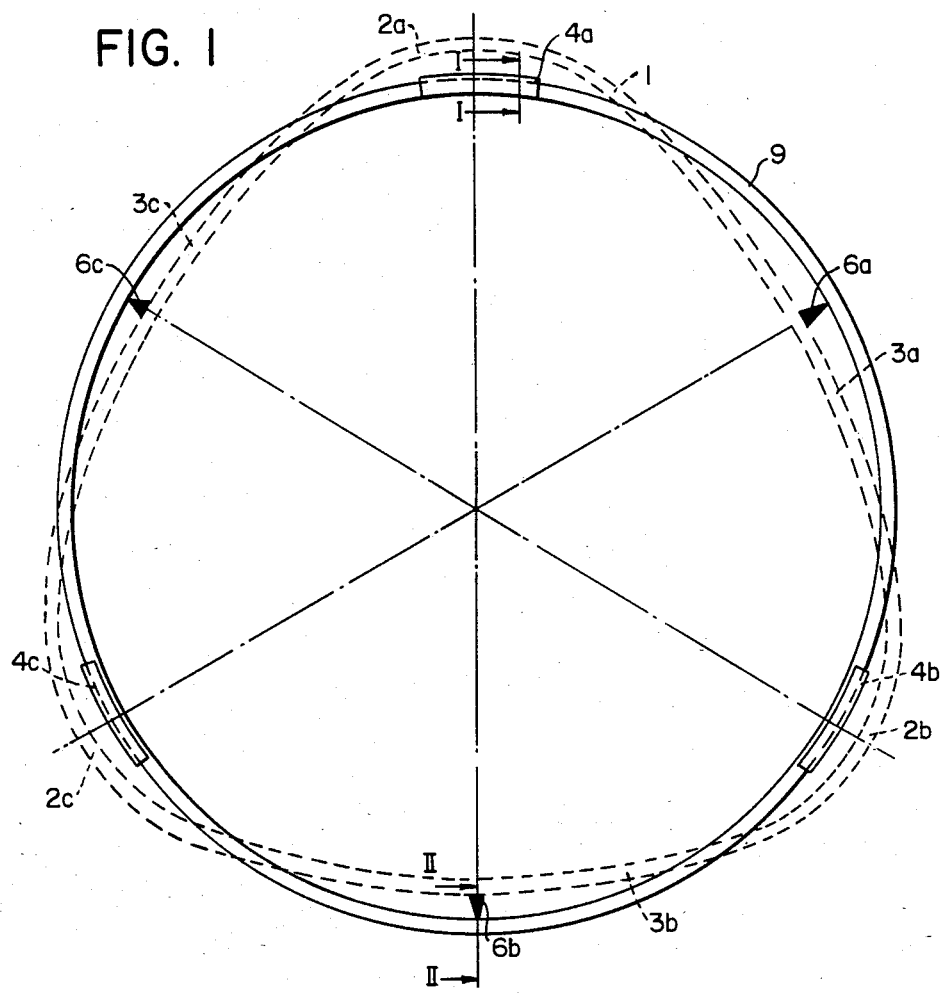
FIG. 1 is an elevational view of the wire ring constructed as a bent spring in different positions with the coordinated guides and/or nose-like retaining members, wherein the contour of the wheel cover is omitted.

Referring now to the drawings, wherein like reference numerals are used throughout the various views to designate like parts, the wire ring of a wheel cover in accordance with the present invention, which is constructed as a bent spring, is shown in dashed lines in FIG. 1 in the non-installed condition and designated therein by reference numeral 1. This bent spring includes six sections 2a, 2b, 2c and 3a, 3b, 3c. Sections 2a, 2b, 2c each have a contour in the shape of generally circular arcs and are coordinated to guides 4a, 4b and 4c connected with a wheel cover 7. Sections 2a, 2b and 2c are disposed between selected pairs of sections 3a, 3b, 3c, respectively.

The bent spring 1 can be manufactured with low material and manufacturing expenditures and ideally can possess a soft spring characteristic. As a result thereof, eventual manufacturing tolerances in the diameter of the cover affect only very slightly the available spring force.

Figure 2:
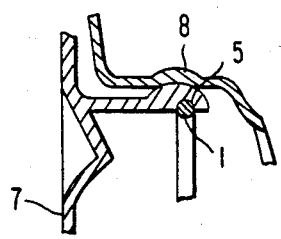
FIG. 2 is a cross-sectional view, taken along line I—I of FIG. 1, showing the relationship of the wheel cover, wheel rim and bent spring.

The guides 4a, 4b and 4c are constructed as tab-shaped covers 5, as can be seen from FIG. 2. These guides may be made from elastic material, for example, synthetic plastic material, whereby the guides can yield somewhat during the insertion of the bent spring 1 and whereby damaging or scratching of the wheel rim is prevented. The wheel cover 7 is shown relative to the wheel rim 8 in this figure.

The bent spring 1, prior to the mounting of the wheel cover on the wheel rim, is first fixed in the wheel cover. For that purpose, the wire ring 1 is inserted in the guides 4a, 4b and 4c in a manner not illustrated in detail and is retained by nose-like retaining portions 6a, 6b and 6c. At that time, the bent spring 1 does not yet assume an ideal circularly shaped contour. The nose-like retaining portions 6a, 6b and 6c secure the bent spring in this position. The largest amount of deflection for the radial deformation of the bent spring therefore takes place during the insertion of the bent spring in the wheel cover. Additionally, axial securing means for the bent spring 1 may be provided in a known manner, not shown herein.

Figure 3:
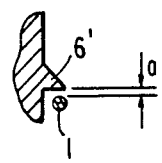
FIG. 3 is a cross-sectional view taken along line II—II of FIG. 1.

During the mounting of the wheel cover on the wheel rim, contact is established between the guides 4a, 4b and 4c and the wheel rim. This can be seen in FIG. 2, where the wheel rim is illustrated only in part and designated by reference numeral 8. The bent spring 1 lifts off each of the nose-like retaining members 6a, 6b and 6c, as can be seen from FIG. 3, with the distance between the bent spring 1 and each respective nose-like retaining member, designated in FIG. 3, by distance a. The bent spring 1 now assumes a circularly shaped contour as a result of the pressure exerted thereon by the guides 4a, 4b and 4c, respectively. This contour is shown in FIG. 1 in solid lines and designated therein by reference numeral 9. In the installed condition, the bent spring 1 thus occupies only very little space on the inside of the wheel cover.

Figure 4:
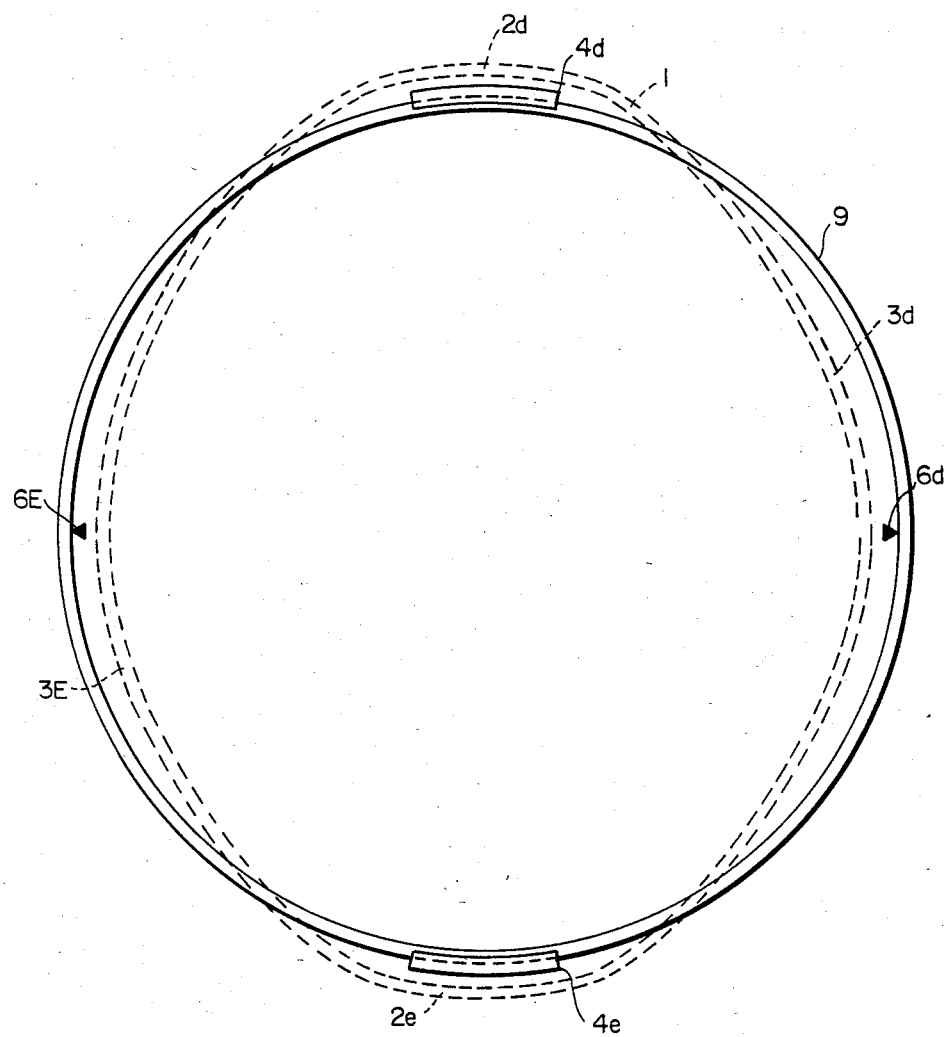
FIG. 4 is a similar elevational view to FIG. 1, but showing the modification of only using two guides.

In the FIG. 4 modification, only two guides 4d and 4e and two nose-like retaining members 6d and 6e are required. Additionally, the essential movement during the deformation of the bending spring has to take place when the bending spring is clamped into the guidances. As a result of the soft spring characteristics, tolerance-conditioned fluctuations of the wheel cover diameter have only very little effect on the available spring force.

While I have shown and described only one embodiment in accordance with the present invention, it is understood that the same is not limited thereto but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. A wheel cover comprising a wire ring, at least two guide means, said wire ring being received in the installed condition by said guide means secured at the wheel cover, said guide means being operable to engage in corresponding recesses of a wheel rim, the wire ring being constructed as prestressed bending spring and having in the unstressed condition a non-circular circumference formed by more than one ring section, some of the sections being coordinated one to each of the guide means with the remaining sections disposed therebetween, and the bending spring attaining a shape at least approximating a circle after being clamped into the guide means of the wheel cover and after mounting of the wheel cover on the wheel rim.

2. A wheel cover according to claim 1, wherein the sections of the prestressed bending spring in the unstressed condition thereof have a configuration of substantially regular non-circular shape which is not intersected at any point by a tangent placed along its circumference.

3. A wheel cover according to claim 2, wherein the sections are constructed arcuately shaped, and wherein the sections disposed between the guide means sections enclose an inscribed regular polygon whereas the sections coordinated to the guide means intersect the corners of said polygon.

4. A wheel cover according to claim 3, wherein the sections coordinated to the guide means are shorter than the sections disposed therebetween.

5. A wheel cover according to claim 4, wherein the sections of said wire spring are constructed as circular segments.

6. A wheel cover according to claim 5, wherein the circular segments coordinated to the guide means and the circular segments coordinated to the sections disposed therebetween have at least one of different arcuate lengths, different circle center points and different radii.

7. A wheel cover according to claim 6, wherein the segments coordinated to the sections disposed between the guide means circumscribe a regular triangle.

8. A wheel cover according to claim 7, wherein the guide means are constructed as tab-shaped covers and are provided with a groove serving to receive the bending spring.

9. A wheel cover according to claim 8, further comprising nose-like holding means provided on the wheel cover intermediate the guide means, said holding means forming abutments directed radially outwardly, and the bending spring abutting at said abutments in the condition when clamped into the guide means while the wheel cover is not yet mounted on the wheel rim.

10. A wheel cover according to claim 1, wherein the sections are constructed arcuately shaped, and wherein the sections coordinated to the sections disposed between the guide means enclose an inscribed regular polygon whereas the sections coordinated to the guide means intersect the corners of said polygon.

11. A wheel cover according to claim 1, wherein the sections coordinated to the guide means are shorter than the sections coordinated to the sections disposed therebetween.

12. A wheel cover according to claim 11, wherein the sections of said wire spring are constructed as circular segments.

13. A wheel cover according to claim 12, wherein the circular segments coordinated to the guide means and the circular segments coordinated to the sections disposed therebetween have at least one of different arcuate lengths, different circle center points and different radii.

14. A wheel cover according to claim 1, wherein the sections coordinated to the sections disposed between the guide means circumscribe a regular triangle.

15. A wheel cover according to claim 1, wherein the guide means are constructed as tab-shaped covers and are provided with a groove serving to receive the bending spring.

16. A wheel cover according to claim 15, further comprising nose-like holding means provided on the wheel cover intermediate the guide means, said holding means forming abutments directed radially outwardly, and the bending spring abutting at said abutments in the condition when clamped into the guide means while the wheel cover is not yet mounted on the wheel rim.

* * * * *